(12) United States Patent
Patil

(10) Patent No.: US 10,024,966 B2
(45) Date of Patent: Jul. 17, 2018

(54) EFFICIENT IMPLEMENTATION OF DISTANCE DE-ALIASING FOR RANGING SYSTEMS USING PHASE DOMAIN COMPUTATION

(71) Applicant: Texas Instruments Incorporated, Dallas, TX (US)

(72) Inventor: Bharath Patil, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 243 days.

(21) Appl. No.: 15/009,332

(22) Filed: Jan. 28, 2016

(65) Prior Publication Data

US 2016/0216376 A1    Jul. 28, 2016

Related U.S. Application Data

(60) Provisional application No. 62/108,885, filed on Jan. 28, 2015, provisional application No. 62/273,858, filed on Dec. 31, 2015.

(51) Int. Cl.
| | | |
|---|---|---|
| G01C 3/08 | (2006.01) | |
| G01S 17/36 | (2006.01) | |
| G01S 17/89 | (2006.01) | |
| G01S 7/491 | (2006.01) | |

(52) U.S. Cl.
CPC .......... *G01S 17/36* (2013.01); *G01S 7/4915* (2013.01); *G01S 17/89* (2013.01)

(58) Field of Classification Search
CPC ......... G01S 17/36; G01S 17/89; G01S 7/4915
USPC ....................................................... 356/5.01
See application file for complete search history.

(56) References Cited

U.S. PATENT DOCUMENTS

| | | | | |
|---|---|---|---|---|
| 9,134,114 | B2* | 9/2015 | Metz | G01S 17/89 |
| 9,418,425 | B2* | 8/2016 | Park | G01S 17/36 |
| 9,702,976 | B2* | 7/2017 | Xu | G01S 17/32 |
| 2016/0047913 | A1* | 2/2016 | Lamesch | G01S 17/36 |
| | | | | 702/159 |

* cited by examiner

*Primary Examiner* — Mark Hellner
(74) *Attorney, Agent, or Firm* — John R. Pessetto; Charles A. Brill; Frank D. Cimino

(57) ABSTRACT

A system and method for determining a distance to a surface of interest, such as in a Time of Flight (ToF) system, includes projecting modulated electromagnetic radiation of at least two frequencies to a point on the surface of interest, receiving the electromagnetic radiation reflected from the point on the surface of interest and demodulating the received electromagnetic radiation. Whereupon, a weighted phase difference between the frequencies may be calculated, in accordance with the present systems and methods, and one bin for each of the reflected frequencies for an actual distance to the point on the surface of interest is calculated using the weighted phase difference. A final phase of the bin for the actual distance is calculated as a weighted average of the phases of the bins based on the reflected signal strengths, and the actual distance to the point on the surface of interest is then output.

20 Claims, 6 Drawing Sheets

EFFICIENT IMPLEMENTATION OF DISTANCE DE-ALIASING FOR RANGING SYSTEMS USING PHASE DOMAIN COMPUTATION

CROSS-REFERENCE TO RELATED APPLICATIONS

The present application claims the benefit of the filing date of U.S. Provisional Patent Application Ser. No. 62/108,885, filed Jan. 28, 2015, and U.S. Provisional Patent Application Ser. No. 62/273,858, filed Dec. 31, 2015, each also entitled Efficient Implementation of Distance De-Aliasing for Ranging Systems Using Phase Domain Computation, each of which are also incorporated herein in their entirety, by reference.

TECHNICAL FIELD

Aspects of this disclosure are directed, in general, to distance measurement and, more specifically, to efficient implementation of distance de-aliasing for ranging systems using phase domain computations.

BACKGROUND

Many ranging systems use a single frequency, continuous wave for ranging. Such systems measure the phase of the received reflected wave with respect to the transmitted wave to measure the distance of the object in the scene. The phase of the returning wave "wraps" at $2\pi$, thereby leading to a distance ambiguity. A common technique to extend the range is to use another frequency of operation and extend the unambiguous range to the Least Common Multiple (LCM) of the two ranges. However, the calculations involved are complex and requiring significant Integrated Circuit (IC) silicon area and/or time to compute the de-aliased (actual) distance.

In practical scenarios, since the measurements from the two frequencies will not match perfectly, a search for the best match is typically performed in the distance domain after converting the plurality of acquired phases to distances. Some existing methods use a search algorithm to find the closest match for the two frequencies to find the bin (set) in which the object lies. The search takes a O(n) time where, n is proportional to the range extension (i.e. extension beyond wrap of the phase of the measuring frequencies) if implemented on a serial processor or takes O(n) silicon area if implemented in a parallel processor. Some existing methods use a divider to compute with O(1) time complexity, but dividers are expensive in terms of IC silicon area and/or processor time.

SUMMARY

Aspects of the disclosure provide an implementation for determining a distance to a surface of interest, such as, for example in a Time of Flight (ToF) system, includes projecting modulated electromagnetic radiation of at least two frequencies to a point on the surface of interest, receiving the electromagnetic radiation reflected from the point on the surface of interest. Whereupon, a weighted phase difference between the received frequencies may be calculated, in accordance with the present systems and methods, and respective bins for each of the reflected frequencies for an actual distance to the point on the surface of interest is calculated using the weighted phase difference. A final phase of the bin for the actual distance to the point on the surface of interest may be calculated as a weighted average of phases of the respective bins based on the signal strengths of the at least two reflected frequencies. The actual distance to the point on the surface of interest is then output.

Thus, a ToF system may, in accordance with embodiments of the present systems and methods, include at least one illumination module to project modulated electromagnetic radiation of at least two frequencies to a point on a surface of interest, a sensor configured to receive and demodulate electromagnetic radiation reflected from the surface of interest and a ToF controller apparatus operatively coupled to the sensor.

The controller apparatus may take the form of, and/or employ a time of flight distance de-aliasing apparatus that includes an input from at least one time of flight sensor apparatus to receive a demodulated phase of each at least two projected electromagnetic radiation frequencies reflected from a point on a surface of interest and a depth engine. This depth engine may be configured to calculate a weighted phase difference between the frequencies and calculate one bin for each of the reflected frequencies for an actual distance to the point on the surface of interest using the weighted phase difference and calculate the actual distance to the point on the surface of interest based on the final phase. An output may be configured to output the actual distance to the point on the surface of interest.

This apparatus may also include a memory interface, coupled to an external memory, and the depth engine may temporarily store at least a portion of the data associated with demodulated electromagnetic radiation to the external memory for processing in accordance with the present systems and methods.

Calculating the weighted phase difference between the frequencies may include monotonically increasing a value for the weighted phase difference from zero by a difference between the products of a coefficient for each frequency and a phase for each corresponding frequency. The coefficient for each frequency may be proportional to a weight of signal strength of received electromagnetic radiation of each respective frequency in some aspects of the present systems and methods.

Using the calculated weighted phase difference to calculate one bin for each of the frequencies for an actual distance to the point on the surface of interest includes, for each bin, may include performing a bit-wise right shift operation on a product of the weighted phase difference and an integer proportional to a frequency associated with that bin.

Calculating one bin for each of the frequencies for an actual distance to the point on the surface of interest using the weighted phase difference may include comparing an absolute value of the residue of each bin for each of the frequencies to determine which bin has a residue that is greater than or equal to the other bin.

Certain alternative aspects may call for also calculating an unambiguous phase for each of the frequencies using the one bin for each of the frequencies and calculating a final phase of the bin for the actual distance to the point on the surface of interest using the unambiguous phase, using weights operating on the unambiguous phase for each of the frequencies. Using weights operating on the unambiguous phase for each of the frequencies may include calculating a weighted average of the unambiguous phases of the frequencies using weights based on signal strengths of received electromagnetic radiation of the frequencies.

BRIEF DESCRIPTION OF THE DRAWINGS

Figure 1:
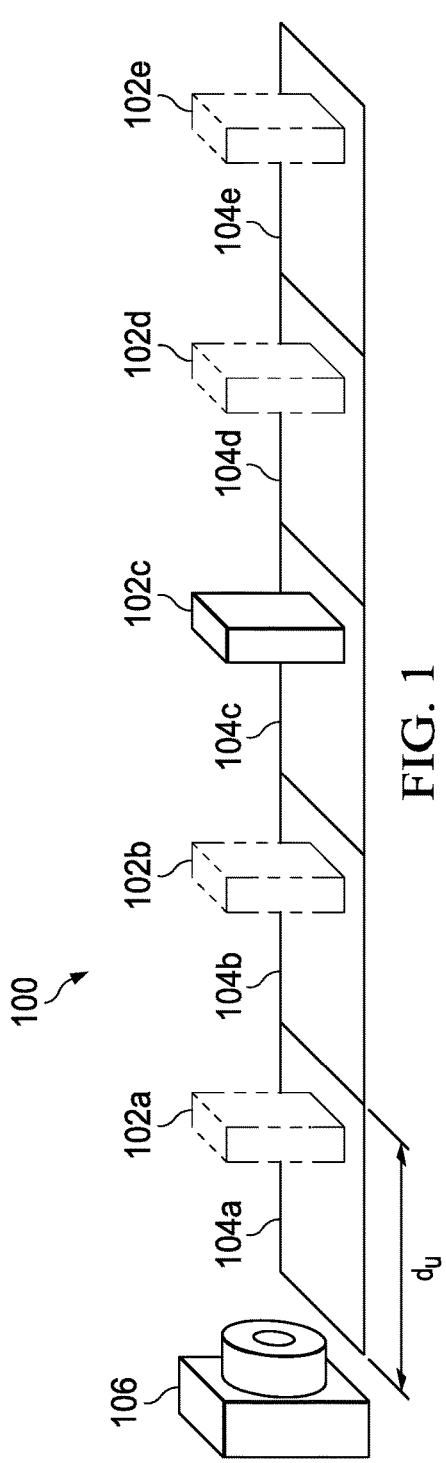
Figure 2:
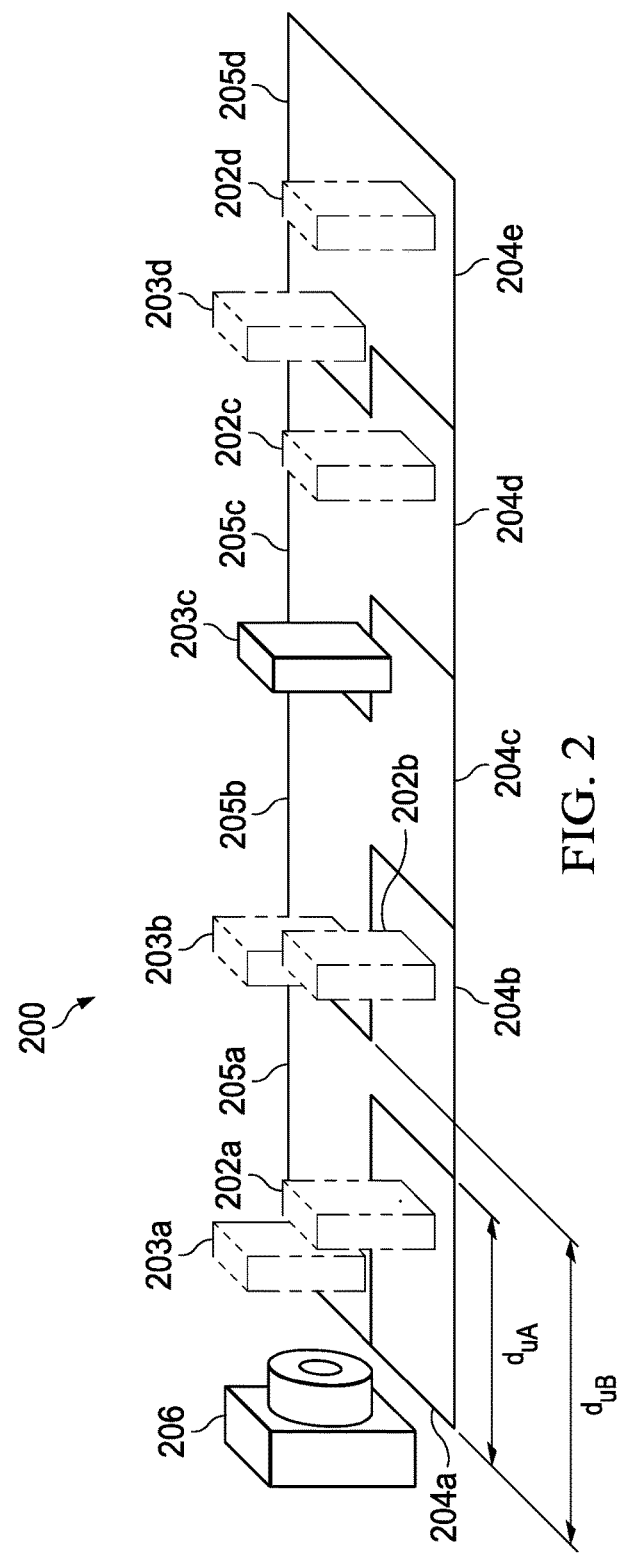
Figure 3:
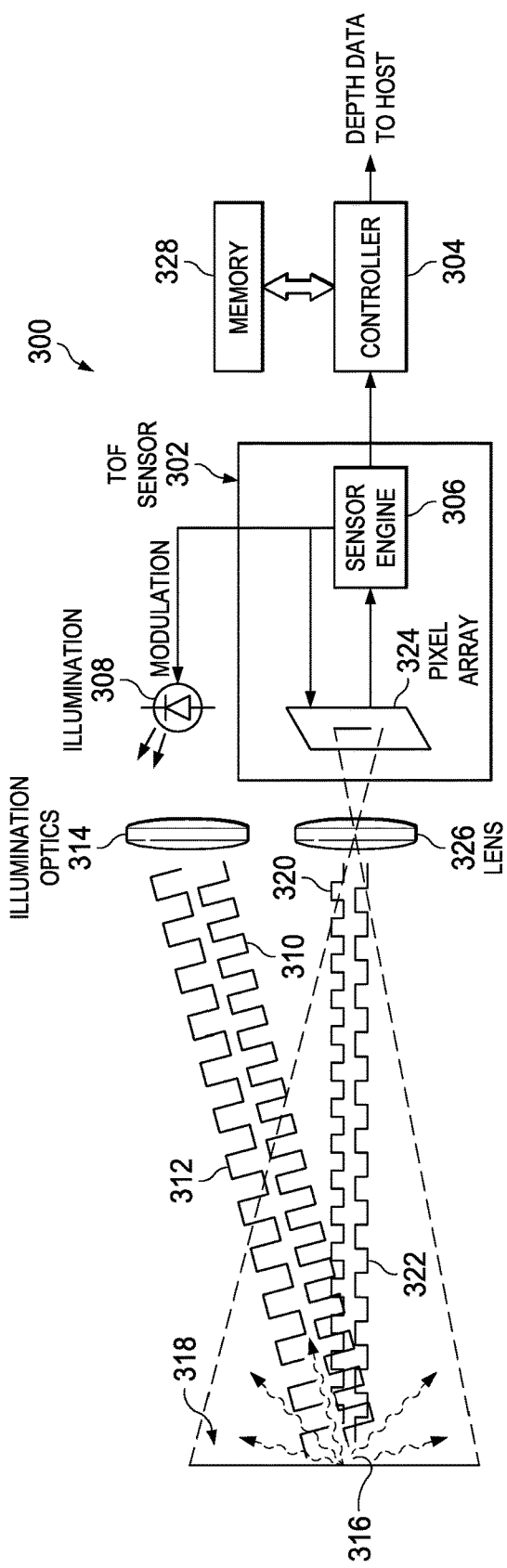
Figure 4:
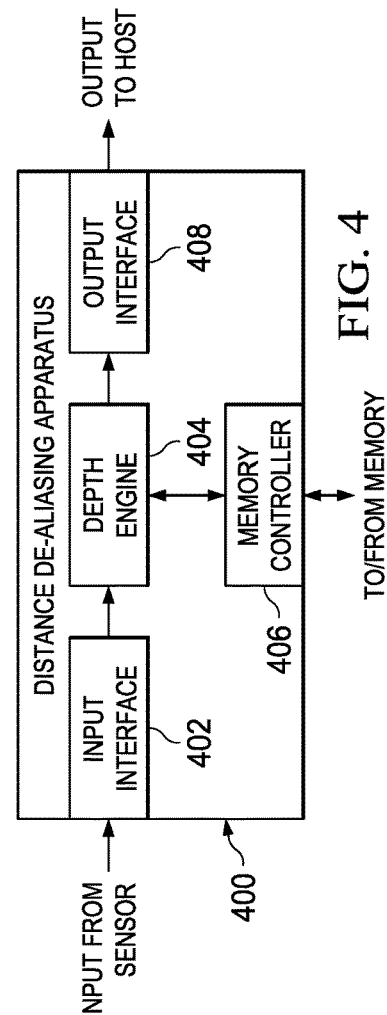
Figure 5:
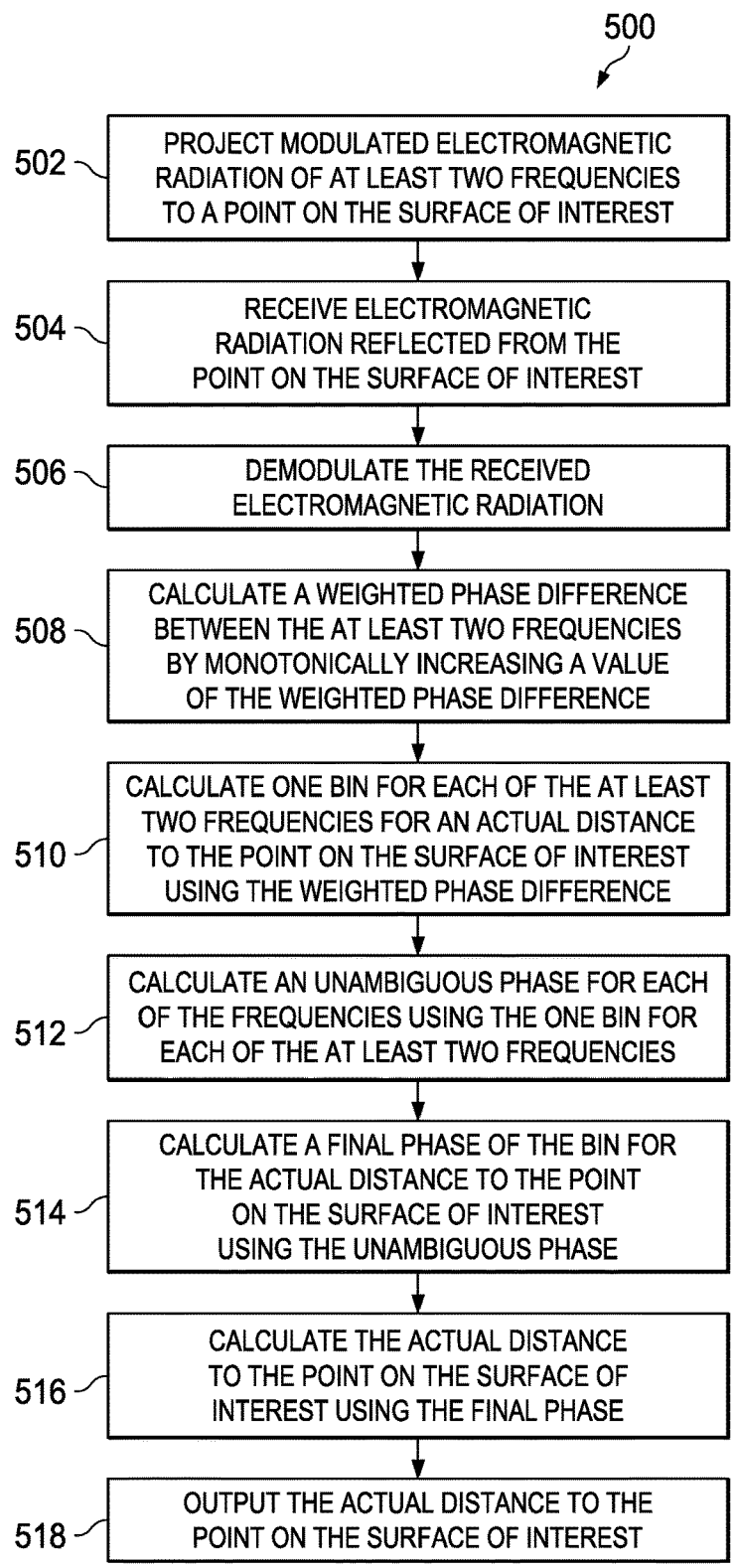
Figure 6:
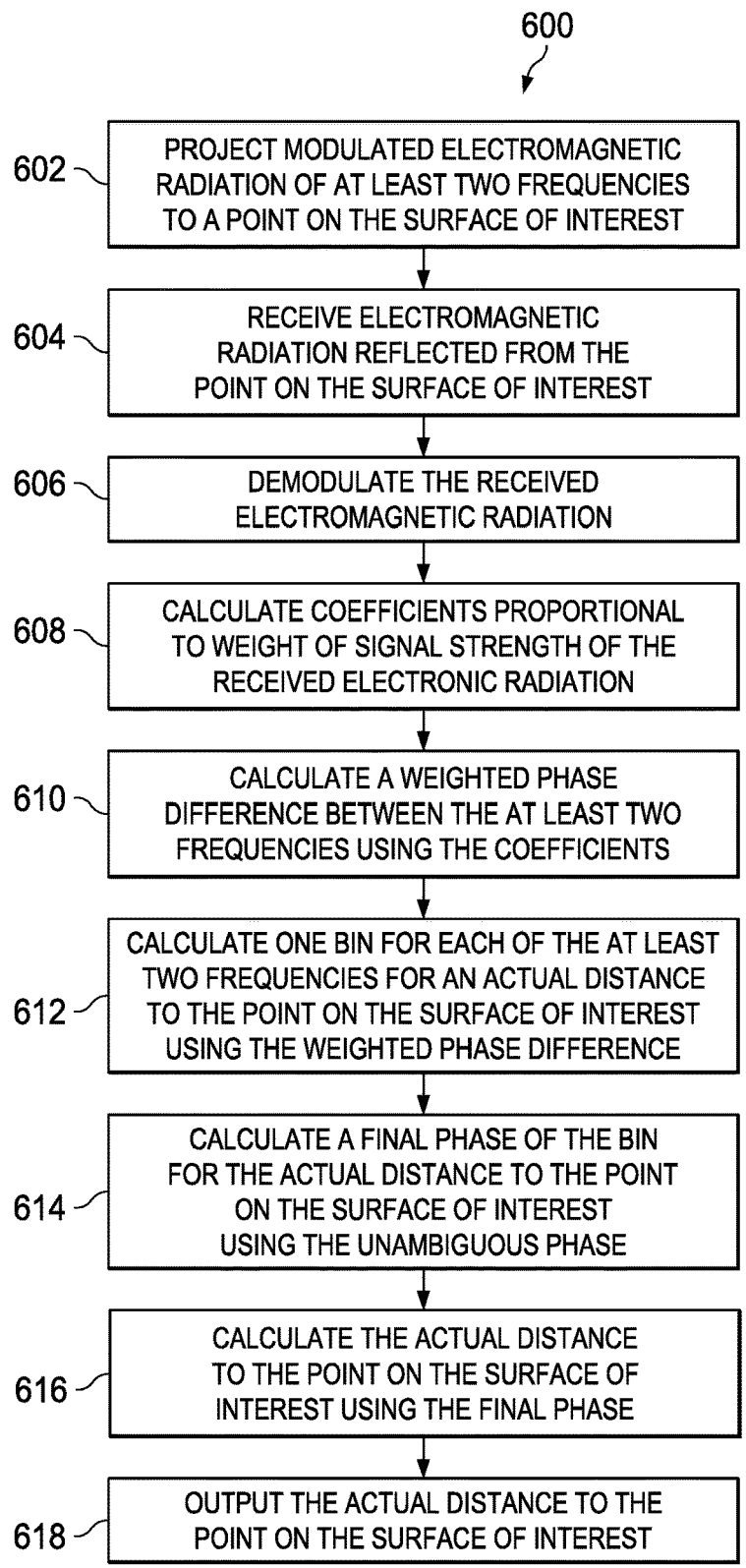

Having thus described the present systems and methods in general terms, reference will now be made to the accompanying drawings, wherein:

FIG. 1 is a diagrammatic representation of single-frequency ranging, according to some embodiments;

FIG. 2 is a diagrammatic representation of multi-frequency ranging, according to some embodiments;

FIG. 3 is a block diagram of a 3D ToF camera implementation using a ToF sensor and a controller, in accordance with some embodiments;

FIG. 4 is a block diagram of a 3D ToF distance de-aliasing apparatus, in accordance with some embodiments;

FIG. 5 is a flowchart of an implementation of efficient distance de-aliasing for ranging systems using phase domain computation, in accordance with some embodiments;

FIG. 6 is a flowchart of another implementation of efficient distance de-aliasing for ranging systems using phase domain computation, in accordance with some embodiments; and FIGS. 7A through 7D graph implementation of an embodiment of the present systems and methods for distance de-aliasing using the phase domain, in accordance with some embodiments.

DETAILED DESCRIPTION

The techniques of this disclosure now will be described more fully hereinafter with reference to the accompanying drawings. These techniques may, however, be embodied in many different forms and should not be construed as limited to the embodiments set forth herein. Rather, these embodiments are provided so that this disclosure will be thorough and complete, and will fully convey the scope of this disclosure to those skilled in the art. One skilled in the art may be able to use the various embodiments described herein.

Time of Flight (ToF) cameras provide a depth map of a scene. In contrast with scanning type light detection and ranging (LIDAR) systems, the depth map of the entire scene is captured at the same instant with an array of ToF pixels. In particular, a time-of-flight camera (ToF camera) is a range imaging camera system that resolves distance based on the known speed of light, measuring the time-of-flight of a light signal between the camera and the subject for each point of the image. A time-of-flight camera generally includes an illumination unit that illuminates the subject with light modulated with frequencies up to 100 MHz. The illumination unit normally uses infrared light to make the illumination unobtrusive. A lens can be used to gather the reflected light and images the environment onto an image sensor, with an optical band-pass filter passing the light with the same wavelength as the illumination unit. This helps suppress non-pertinent light and reduce noise. At the image sensor, each pixel measures the time the light has taken to travel from the illumination unit to the object and back to the sensor. From this time, a distance to the subject at that point can be determined.

As noted, ranging systems may use a single frequency, continuous wave for ranging. Such systems measure the phase of the received reflected wave with respect to the transmitted wave to measure the distance of the object in the scene. The phase of the returning wave "wraps" at $2\pi$, thereby leading to a distance ambiguity. FIG. 1 is a diagrammatic representation of single-frequency ranging 100, according to some embodiments. Therein, the single-frequency ranging process returns several possible distances corresponding to possible measured locations 102a through 102e of an object of interest. The distance corresponding to a measured location of the object may refer to the distance between the measured location of the object and the camera. While the distance to measured location 102c is the actual distance to the object of interest, the distance to measured location 102a is the measured unambiguous distance within an unambiguous range ($d_u$) 104a of the frequency (i.e. within $2\pi$) employed by camera 106, and the distances to measured locations 102b, 102d and 102e are further possible distances returned as a result of wrapping of the frequency beyond a to provide further ambiguous ranges 104b through 104e.

As also noted, a common technique to extend range is to use another frequency of operation and extend the unambiguous range to the Least Common Multiple (LCM) of the two ranges. FIG. 2 is a diagrammatic representation of multi-frequency ranging 200, according to some embodiments. Therein, illustrated two-frequency ranging returns several more possible distances to measured locations 202a through 202d and 203a through 203d to an object of interest. As illustrated, 203c is the actual location of the object of interest. However, the distance to measured location 202a is a measured unambiguous distance within an unambiguous range ($d_{uA}$) 204a of a first frequency (i.e. within $2\pi$) employed by camera 206, and locations 202b through 202d are further possible locations returned as a result of wrap of the first frequency beyond $2\pi$ to provide further ambiguous ranges 204b through 204e. While the actual distance to location 203c is returned using the second frequency, the second frequency also returns locations 203a, 203b and 203d. The distance to location 203a is a measured unambiguous distance within an unambiguous range ($d_{uB}$) 205a of the second frequency (i.e. within $2\pi$) employed by camera 206, and locations 203b and 203d are further possible distances returned as a result of wrapping of the first frequency beyond a to provide further ambiguous ranges 205b through 205d. Since the measurements from the two frequencies will not match perfectly, a search for the best match is typically performed in the distance domain after converting the plurality of acquired phases to distances. However, the calculations involved are complex and require significant Integrated Circuit (IC) silicon area and/or time to compute the de-aliased (actual) distance.

Embodiments of the present systems and methods provide efficient implementation of distance de-aliasing for multi-frequency ranging systems, such as may be used in three dimensional (3D) ToF cameras, through the use of phase domain computations. Applications for a three dimensional (3D) camera employing ToF include presence detection, object location, movement detection, and 3D scanning. A ToF 3D camera may employ a ToF sensor and a controller, or the like.

FIG. 3 is a block diagram of 3D ToF camera implementation 300 using ToF sensor 302 and controller 304, in accordance with some embodiments. Either or both of sensor 302 and controller 304 may include one or more Integrated Circuits (ICs), or the like, separately or together. As noted, a technique to extend the range of a ranging system uses two frequencies of operation to extend the unambiguous range to the LCM of the two ranges. ToF camera system 300 employs at least one illumination module, which may be made-up an illumination driver such as may be provided via sensor engine 306 and illumination source 308, which is configured to project modulated electromagnetic radiation of at least two frequencies 310 and 312, such as through illumination optics 314, to point 316 on surface of interest 318. Sensor engine 306 may also be configured to receive electromagnetic radiation 320 and 322 reflected from the surface of interest, via sensor pixel array 324, such as may be received back at camera 300 through lens 326. Sensor engine 306 may also demodulate electromagnetic radiation 320 and 322 reflected from the surface of interest and provide phase measurements of the electromagnetic radiation 320 and 322 reflected from the surface of interest and/or data related thereto to controller 304.

Thus, controller 304 is operatively coupled to sensor 302. Controller 304 may compute a de-aliased distance of the point on the surface of interest using the phase measurements from the electromagnetic radiation 320 and 322 reflected from the surface of interest. Controller 304 may be coupled to external memory 328. Controller 304 may temporarily store at least a portion of data associated with demodulated electromagnetic radiation, such as received from sensor 302 for processing. The de-aliased distance to the point on the surface of interest may be output by controller 306 as depth data, or the like, to at least one host device.

FIG. 4 is a block diagram of a 3D ToF distance de-aliasing apparatus 400, in accordance with some embodiments. Apparatus 400 may be employed as controller 304 of camera 300, or as a part thereof. ToF distance de-aliasing apparatus 400 includes input interface 402 which may be operatively coupled to receive input from at least one ToF sensor apparatus, such as sensor 302. Thereby, apparatus 400 is configured to receive demodulated phase measurements of each of two or more projected electromagnetic radiation frequencies reflected from a point on a surface of interest. This phase data may be passed to and employed by distance de-aliasing apparatus depth engine 404 to compute the de-aliased distance of the point on the surface of interest using the phase measurements from projected electromagnetic radiation reflected from the surface of interest. These computations may be carried-out in accordance with implementations 500 and/or 600 described below, with respect to FIGS. 5 and 6.

Distance de-aliasing apparatus 400 may further include memory controller 406 configured to interface with external memory (such memory 328 of camera 300). Depth engine 404 may temporarily store at least a portion of received data associated with demodulated electromagnetic radiation, such as received sensor data, for processing to compute the de-aliased distance of the point on the surface of interest. Distance de-aliasing apparatus 400 may also include an output interface adapted to output the de-aliased distance to the point on the surface of interest as depth data, or the like, to at least one host device.

Embodiments of the present systems and methods may efficiently implement distance de-aliasing for ranging systems using phase domain computation to extend the unambiguous range of Time of Flight (ToF) cameras, or the like. FIG. 5 is a flowchart of implementation 500 of efficient distance de-aliasing for ranging systems using phase domain computation, in accordance with some embodiments. Therein, a distance to a surface of interest is determined in a ToF ranging system, such as system 300 illustrated and described above. Working in the phase domain instead of the distance domain enables use of more efficient computations of the de-aliased distance of the object, given two phase measurements from the use of two frequencies. To this end, modulated electromagnetic radiation of at least two frequencies is projected to a point on the surface of interest, such as via illumination functionality of the ToF system at 502. At 504 electromagnetic radiation reflected from the point on the surface of interest is received, such as by a sensor of the ToF system and is demodulated at 506 to provide phases of reflected electromagnetic radiation corresponding to the at least two frequencies to a depth engine (404). Such demodulation may be performed by diverting generated electrons to one node or the other of the sensor (302). Such direct demodulation may be considered a type of homodyning and may provide amplitude demodulation at a modulation frequency. That is, the demodulation frequency and modulation frequency are the same. Therefore, correlation between the demodulation frequency and modulation frequency is reflective of a phase to be provided to the depth engine (404).

The unambiguous range to a point of interest in a ToF system is defined by the modulation frequency (f). If the total range of the application is beyond the unambiguous range for a given modulation frequency, de-aliasing can be enabled to extend the unambiguous range. This technique, as described above, employs two modulation frequencies ($f_1$ and $f_2$). The unambiguous range (R) to the object of interest is given by:

$$R = c/2 * GCD(f_1, f_2) \qquad \text{Eq. 1}$$

wherein c is the speed of light and GCD is the Greatest Common Devisor.

Embodiments of the present systems and methods call for working in the phase domain instead of the distance domain for finding the correct bin, that is, the bin in which the subject object lies. Implementation of the present systems and methods have a complexity of O(1) and do not use any division operations. Hence, when implemented in an IC, or the like it occupies less die area, or takes less time for computation, compared to existing de-aliasing systems and methods.

When at least two frequencies, $f_1$ and $f_2$, are used for distance measurement, at least two phases, $p_1$ and $p_2$, are obtained, such as in steps 502 through 506 discussed above (e.g. as a result of demodulation at 506 of the electromagnetic radiation reflected from the point on the surface of interest). Assuming that the phases are N-bit numbers where the full scale value corresponds to $2\pi$, and assuming $m_1$ and $m_2$ are two integers chosen such that:

$$f_1/f_2 = m_1/m_2 \qquad \text{Eq. 2}$$

then constants $k_1$, $k_2$ may be pre-computed such that the following relationship is met:

$$k_1 \times m_1 - k_2 \times m_2 = 1 \qquad \text{Eq. 3}$$

At 508 a weighted phase difference ($p_d$) between the phases obtained (in step 506) for the at least two frequencies is calculated by a depth engine (404) or the like. This calculation of the weighted phase difference between the at least two frequencies may include monotonically increasing a value for the weighted phase difference from zero by a difference between the products of a coefficient for each frequency and a phase for each corresponding frequency. In this regard, the below function yields a monotonically increasing value from 0 to $2^N-1$ with increase in distance from 0 to unambiguous range:

$$p_d = (k_1 \times p_1 - k_2 \times p_2) \& (2^N - 1) \qquad \text{Eq. 4}$$

Where, "&" is used to denote the "bit-wise AND" operation. (Bitwise AND takes two equal-length binary representations and performs the logical AND operation on each pair of the corresponding bits, by multiplying them.) As discussed in greater detail below, the coefficient for each frequency ($k_1$ and $k_2$) may be calculated such that they are each proportional to a weight of signal strength of received electromagnetic radiation of each respective frequency, to provide further efficiency in accordance with various embodiments of the present systems and methods.

At 510, one bin for each of the at least two frequencies for an actual distance to the point on the surface of interest is calculated, by the depth engine, or the like, using the weighted phase difference, such as by performing a bit-wise right shift operation on a product of the weighted phase difference and an integer proportional to a phase associated with each frequency. In this regard, the value $p_d$ can be used to find the correct bin in which the object lies, as follows:

$$b_1 = (p_d * m_1) >> N \qquad \text{Eq. 5}$$

$$b_2 = (p_d * m_2) >> N \qquad \text{Eq. 6}$$

Where, $b_1$ and $b_2$ correspond to the calculated bins and $>>$ represents the bit-wise right shift operator.

An unambiguous phase for each of the frequencies may be calculated at 512 using the one bin for each of the frequencies for the actual distance to the point on the surface of interest. Hence, bins $b_1$ and $b_2$ can be used to calculate the unambiguous phase ($p_{n1}$ and $p_{n2}$) for each frequency as follows:

$$p_{n1} = (b_1 << N + p_1) * m_2 \qquad \text{Eq. 7}$$

$$p_{n2} = (b_2 << N + p_2) * m_1 \qquad \text{Eq. 8}$$

Where, $<<$ represents the bit-wise left shift operator.

Due to phase measurement errors around the wrapping edges of $p_1$ and $p_2$, it is possible that $b_1$ or $b_2$ may disagree (i.e. are off or may differ) by one. However, since both $p_1$ and $p_2$ do not reach $2\pi$ at the same distance, except at distances of zero and the extended unambiguous range, only one of $b_1$ and $b_2$ may be incorrect in this case. Such cases of disagreement may be resolved by noting that $p_{n1}$ and $p_{n2}$ vary greatly from each other. Residues may be used to resolve the contention, as follows:

$$res_1 = signed((p_d * m_1) \& (2^N - 1)) \qquad \text{Eq. 9}$$

$$res_2 = signed((p_d * m_1) \& (2^N - 1)) \qquad \text{Eq. 10}$$

Wherein the "signed( )" function treats a binary number as if it is represented in two's complement form, that is, to convey that the binary representation is converted into a signed number before using it as a residue for determining which of the bins is accurate and which of the bins is inaccurate. Hence, if the absolute value (abs) of the residue of $bin_1$ ($res_1$) is greater than the absolute value of the residue of $bin_2$ ($res_2$) (i.e. (abs)($res_1$)>abs($res_2$)), it means that $b_2$ is inaccurate. Otherwise, $b_1$ is inaccurate. The inaccurate bin can then be then corrected by adding or subtracting one so as to make the inaccurate bin equal to the bring the accurate bin. That is, when the inaccurate bin's residue is negative, one is subtracted to correct the inaccurate bin; or when the inaccurate bin's residue is positive, one is added to the inaccurate bin to correct the inaccurate bin.

In the embodiment of FIG. 5, where unambiguous phase for each of the frequencies may be calculated at 512, the final computed phase ($p_u$) equals the weighted average of the phases $p_{n1}$ and $p_{n2}$, where the weights ($w_1$ and $w_2$) are computed based on the signal strengths of the two measurements. Such as:

$$p_u = (w_1 * p_{n1} + w_2 * p_{n2}) / (w_1 + w_2) \qquad \text{Eq. 11}$$

That is, a final phase used for computing, and/or selecting the bin containing the de-aliased distance of the point on the surface of interest may be calculated using weights operating on the unambiguous phase for each of the frequencies at 514. The final de-aliased phase may be used to calculate the distance to the point of interest. The distance to the point of interest may be arrived at by:

$$\text{Distance} = R * p_u / (2^{\text{(number of bits used to represent } p_u)}) \qquad \text{Eq. 12}$$

Where unambiguous range, R is calculated from equation 1.

At 516 the actual distance to the point on the surface of interest, such as may be calculated or selected from a bin using the final phase, and may be output at 518, such as to a host device or system.

In accordance with the above, equation 4 calculates a weighted phase difference ($p_d$) using coefficients $k_1$ and $k_2$ and phases $p_1$ and $p_2$. Then, equations 5 and 6 (and 9 and 10) determine the correct bins for each frequency, using $p_d$. Equations 7 and 8 provide the unambiguous phases $p_{n1}$ and $p_{n2}$ using the calculated bins. The final phase is then calculated using weights $w_1$ and $w_2$ operating on $p_{n1}$ and $p_{n2}$, such that the final computed phase equals the weighted average of the phases $p_{n1}$ and $p_{n2}$, where the weights are computed based on the signal strengths of the two measurements.

In accordance with embodiments of the present systems and methods, choosing coefficients $k_1$ and $k_2$, such that $k_1$ and $k_2$ are proportional to $w_1$ and $w_2$, that is:

$$k_1 / k_2 = w_1 / w_2 \qquad \text{Eq. 13}$$

eliminates need to calculate the unambiguous phases $p_{n1}$ and $p_{n2}$ using the bins and eliminates need to calculate the final phase using weights $w_1$ and $w_2$, operating on $p_{n1}$ and $p_{n2}$, thereby reducing computation further.

FIG. 6 is a flowchart of another implementation (600) of efficient distance de-aliasing for ranging systems using phase domain computation, in accordance with some embodiments. Therein, a distance to a surface of interest is also determined in a ToF ranging system, such as system 300 illustrated and described above. Again, to this end, modulated electromagnetic radiation of at least two frequencies is projected to a point on the surface of interest, such as via illumination functionality of the ToF system at 602. At 604 the electromagnetic radiation reflected from the point on the surface of interest is received by a sensor of the ToF system, or the like, and is demodulated at 606 to provide phases of reflected electromagnetic radiation corresponding to the at least two frequencies to a depth engine (404). As noted, when at least two frequencies, $f_1$ and $f_2$, are used for distance measurement, at least two phases, $p_1$ and $p_2$, are obtained.

As noted, coefficient ($k_1$ and $k_2$) for each frequency used in equations 3 and 4 to to calculate $p_d$ may be calculated at 608 such that they are each proportional to a weight of signal strength of received electromagnetic radiation of each respective frequency, to provide further efficiency in accordance the embodiment of FIG. 6. To compute coefficients $k_1$ and $k_2$, in this manner if:

$$k_1 \times m_1 - k_2 \times m_2 = 1 \qquad \text{Eq. 14}$$

then:

$$(k_1 + m_2) \times m_1 - (k_2 + m_1) \times m_2 = 1 \qquad \text{Eq. 15}$$

Additionally or alternatively:

$$\text{pow}(k_1, n \times (1 + m_1)) \times m_1 - k_2 \times m_2 = 1 \qquad \text{Eq. 16}$$

or, that is:

$$(k_1^{n \times (1 + m_1)}) \times m_1 - k_2 \times m_2 = 1 \qquad \text{Eq. 17}$$

where n is an integer.

The above equations are just two examples for generating such coefficients, $k_1$ and $k_2$ with different ratios. The coefficient pair that comes reasonably close to the desired weights can be used for computing the weighted phase difference. In practice, since the weight ratios sought, where $k_1$ and $k_2$ are proportional to $w_1$ and $w_2$, are nearly 1:1, within a few iterations, sufficiently close coefficients can be found in just two to three iterations of the above equations.

Application of coefficients $k_1$ and $k_2$ derived in this manner in equation 4 at 610 renders a $p_d$, which results in bins $b_1$ and $b_2$ calculated using equations 5 and 6 at 612, which contain the de-aliased distance and/or a final phase used to for computing de-aliased distance, of the point on the surface of interest.

A final phase used for computing, and/or selecting the bin containing the de-aliased distance of the point on the surface of interest may be calculated using weights operating on the unambiguous phase for each of the frequencies at 614. This calculation at 614 may include calculating a weighted average of the unambiguous phases of the frequencies using weights based on signal strengths of received electromagnetic radiation of the frequencies. That is, the final de-aliased phase used to calculate the distance to the point of interest may be calculated at 614 using equation 11, above, $p_u = (w_1 * p_{n1} + w_2 * p_{n2})/(w_1 + w_2)$. Where $w_1$ and $w_2$ are computed based on the signal strengths corresponding to $f_1$ and $f_2$ frequency signals.

The distance to the point of interest may be arrived at using equation 12 (Distance=$R * p_u/(2^{\wedge}$(number of bits used to represent $p_u$))). Thereby, at 616 the actual distance to the point on the surface of interest, such as may be calculated or selected from a bin using the final phase, and may be output at 618, such as to a host device or system.

In verification of the above methods, a desired function has the form of:

$$k_1 * p_1 - k_2 * p_2 + Y = d/D \qquad \text{Eq. 18}$$

which is monotonous with increase in distance. D is the full unambiguous distance and d is the actual distance of the object. Y is some integer which may have to change with distance as the phases $p_1$ and $p_2$ wrap. $k_1$ and $k_2$ need to be found.

Since phase is proportional to frequency:

$$k_1 * m_1 * d/D - k_2 * m_2 * d/D + Y = d/D \qquad \text{Eq. 19}$$

$m_1 * d/D$ and $m_2 * d/D$ need to roll at 1. So Y will change accordingly. Therefore:

$$(k_1 * m_1 - k_2 * m_2) * d/D + Y = d/D \qquad \text{Eq. 20}$$

Therefore, if $k_1 * m_1 - k_2 * m_2 = 1$, and if Y can be eliminated, the equation balances. Y's can be eliminated by stripping the Most Significant Bits (MSBs) in the calculation, such as, in the present context, through operation of equation 4, wherein the weighted phase difference between the reflected frequencies is calculated by monotonically increasing a value for the weighted phase difference from zero by a difference between the products of a coefficient for each frequency and a phase for each corresponding frequency.

Figure 7A:
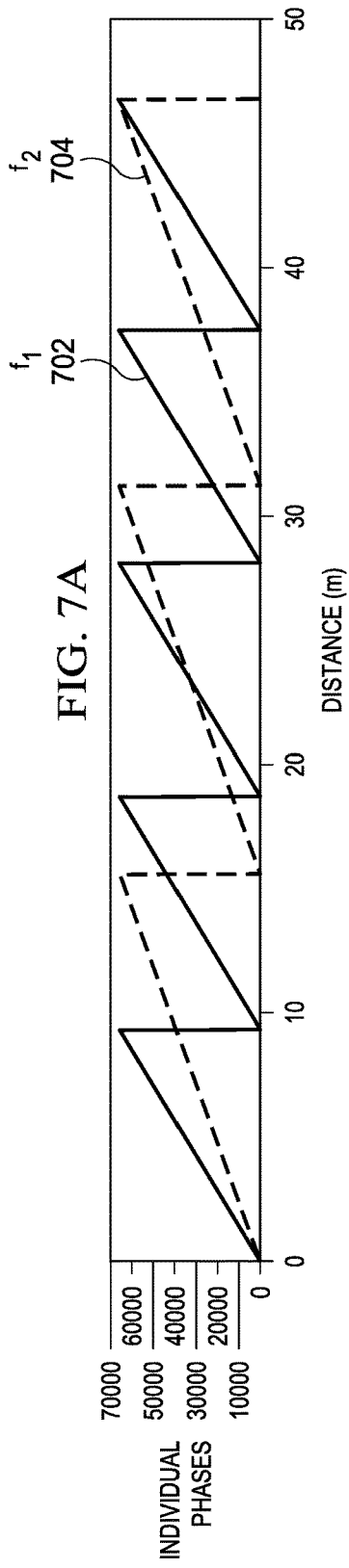
Figure 7B:
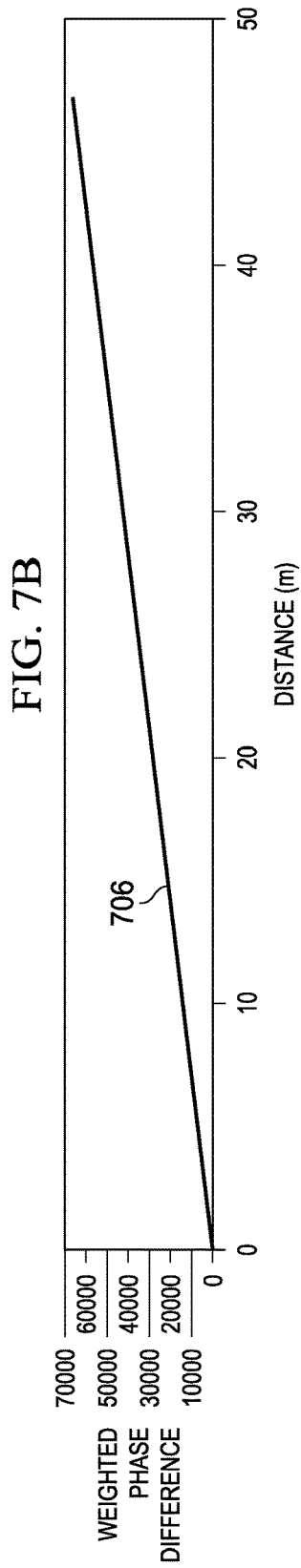
Figure 7C:
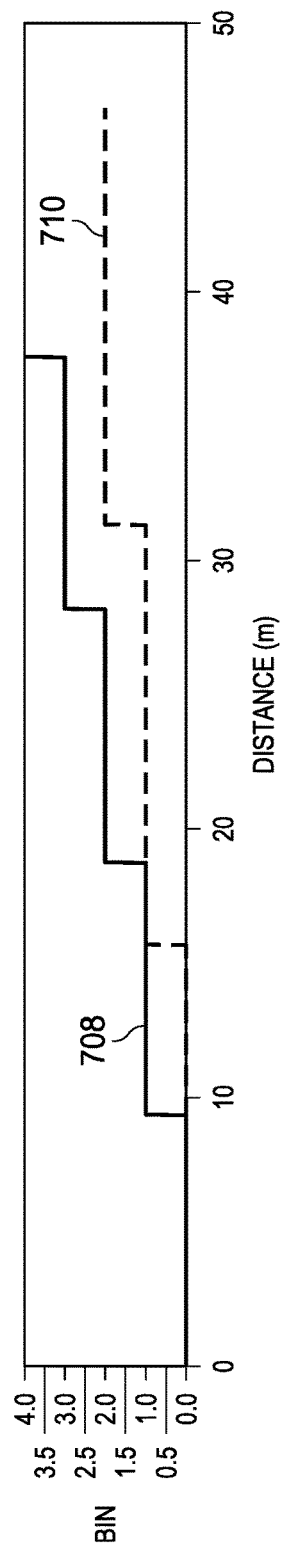
Figure 7D:

FIGS. 7A through 7D graph implementation of an embodiment of the present systems and methods for distance de-aliasing using the phase domain, in accordance with some embodiments. In particular, FIGS. 7A through 7D are simulated results of application of an embodiment of the present systems and methods for a first frequency ($f_1$) of 30 MHz and a second frequency ($f_2$) of 18 MHz with phases (N) of 16 bits, (where, as noted the phases are a N-bit number where the full scale value corresponds to $2\pi$). FIG. 7A shows a graph of the individual phases of two simultaneous ranging frequencies $f_1$ and $f_2$ over the same distances. Therein, line 702 is representative of a 30 MHz measurement frequency, $f_1$, and line 704 is representative of a 18 MHz measurement frequency $f_2$. FIG. 7B graphs weighted phase difference 706 over the same distances upon application of equations 2 through 4, above. FIG. 7C graphs the resulting distance bins ($b_1$ 708 and $b_2$ 710) upon application of equation set 5 and 6 above. Finally, FIG. 7D graphs the calculated distance 712 following use of the residues of the bins, calculated using equation set 9 and 10 above, to determine which is incorrect by determining that (abs)(res$_1$) <abs(res$_2$)), which means that $b_2$ is incorrect. Hence, $f_1$ is providing the proper measured distance in accordance with the present systems and methods for efficient implementation of distance de-aliasing for ranging systems using the phase domain. However, in accordance with embodiments of the present systems and methods $b_2$ can be corrected by adding one.

In accordance with embodiments of the present systems and methods complexity of de-aliasing is reduced to O(1). Also the present systems and methods do not employ dividers, as compared to some other algorithms, and hence the present systems and methods require lower IC implementation area. Further, the reduction of complexity reduces IC implementation area and processing requirements. For example, as a result of application of the present systems and methods for distance de-aliasing using the phase domain, a silicon area reduction of about fifty to sixty percent can be realized in ranging system ICs and/or ranging components of other ICs, with even greater reductions in Field-Programmable Gate Arrays (FPGAs) because of the use of existing multipliers in the computation(s). For example, in FPGAs existing hardware multipliers may be used for calculations such as, $k_1 * p_{d1} - k_2 * p_{d2}$ and the like.

ToF applications, particularly three-dimensional (3D) ToF applications, which include both industrial and intuitive consumer user interface applications, can make use of the present systems and method reduce die area on an Application Specific Integrated Circuit (ASIC) or logical element usage on an FPGA implementing ranging in accordance with the present efficient implementation of distance de-aliasing for ranging systems using phase domain computation.

Many modifications and other embodiments will come to mind to one skilled in the art to which this disclosure pertains having the benefit of the teachings presented in the foregoing descriptions, and the associated drawings. Therefore, it is to be understood that the techniques of this disclosure are not to be limited to the specific embodiments disclosed. Although specific terms are employed herein, they are used in a generic and descriptive sense only and not for purposes of limitation.

What is claimed is:

1. A method for determining a distance to a surface, comprising:
    projecting modulated electromagnetic radiation of at least two frequencies to a point on the surface;
    receiving electromagnetic radiation reflected from the point on the surface;
    determining a weighted phase difference between respective phases of the at least two frequencies of received electromagnetic radiation;
    determining a respective bin for each of the at least two reflected frequencies for determining a distance to the point on the surface from a point where the modulated electromagnetic radiation is projected using the weighted phase difference;

determining a final phase of the bin for the distance to the point on the surface from the point where the modulated electromagnetic radiation is projected as a weighted average of phases of the respective bins based on signal strengths of the received electromagnetic radiation of the at least two frequencies; and outputting the distance to the point on the surface from the point where the modulated electromagnetic radiation is projected.

2. The method of claim 1, wherein determining the weighted phase difference between the at least two frequencies includes, monotonically increasing a value for the weighted phase difference from zero by a difference between the products of a coefficient for each frequency and a phase for each corresponding frequency.

3. The method of claim 2, wherein the coefficient for each frequency is proportional to a weight of signal strength of received electromagnetic radiation of each respective frequency.

4. The method of claim 1, wherein using the weighted phase difference to determine one bin for each of the at least two frequencies for the distance to the point on the surface from the point where the modulated electromagnetic radiation is projected includes, for each bin, performing a bit-wise right shift operation on a product of the weighted phase difference and an integer proportional to a frequency associated with that bin.

5. The method of claim 1, wherein determining one bin for each of the at least two frequencies for the distance to the point on the surface from the point where the modulated electromagnetic radiation is projected using the weighted phase difference further includes, comparing an absolute value of the residue of each bin for each of the at least two frequencies to determine which bin has a residue that is greater than or equal to the other bin.

6. The method of claim 1, further including determining an unambiguous phase for each of the frequencies using the one bin for each of the at least two frequencies, and in which determining a final phase of the bin for the distance to the point on the surface from the point where the modulated electromagnetic radiation is projected uses the unambiguous phase, using the weights operating on the unambiguous phase for each of the frequencies.

7. The method of claim 6, wherein using weights operating on the unambiguous phase for each of the frequencies includes determining a weighted average of the unambiguous phases of the frequencies using weights based on signal strengths of received electromagnetic radiation of the frequencies.

8. A time of flight distance de-aliasing apparatus comprising:
an input from at least one time of flight sensor apparatus configured to receive a demodulated phase of each at least two projected electromagnetic radiation frequencies reflected from a point on a surface;
a depth engine configured to:
determine a weighted phase difference between respective demodulated phases of the at least two frequencies; and
determine one bin for each of the at least two reflected frequencies for a distance to the point on the surface from a point where modulated electromagnetic radiation is projected using the weighted phase difference;
determine a final phase of the bin for the distance to the point on the surface from the point where the modulated electromagnetic radiation is projected as a weighted average of the phases of the bins based on the signal strengths of the at least two reflected frequencies; and
determine the distance to the point on the surface from the point where the modulated electromagnetic radiation is projected based on the final phase; and
an output configured to output, to at least one host device, the distance to the point on the surface from the point where the modulated electromagnetic radiation is projected.

9. The apparatus of claim 8, further including a memory interface coupled to an external memory, and wherein the depth engine temporarily stores at least a portion of the data associated with demodulated electromagnetic radiation of at least two frequencies to the external memory.

10. The apparatus of claim 8, wherein determining the weighted phase difference between the at least two frequencies includes, monotonically increasing a value for the weighted phase difference from zero by a difference between the products of a coefficient for each frequency and a phase for each corresponding frequency.

11. The apparatus of claim 10, wherein the coefficient for each frequency is proportional to a weight of signal strength of received electromagnetic radiation of each respective frequency.

12. The apparatus of claim 8, wherein using the weighted phase difference to determine one bin for each of the at least two frequencies for the distance to the point on the surface from the point where the modulated electromagnetic radiation is projected includes, for each bin, performing a bit-wise right shift operation on a product of the weighted phase difference and an integer proportional to a frequency associated with that bin.

13. The apparatus of claim 8, wherein determining one bin for each of the at least two frequencies for the distance to the point on the surface from the point where the modulated electromagnetic radiation is projected using the weighted phase difference further includes, comparing an absolute value of the residue of each bin for each of the at least two frequencies to determine which bin has a residue that is greater than or equal to the other bin.

14. The apparatus of claim 8, wherein the depth engine is further configured to determine an unambiguous phase for each of the frequencies using the one bin for each of the at least two frequencies, and in which determining a final phase of the bin for the distance to the point on the surface from the point where the modulated electromagnetic radiation is projected includes determining a weighted average of the unambiguous phases of the frequencies using weights based on signal strengths of the received electromagnetic radiation of the frequencies.

15. A time of flight system comprising:
at least one illumination module configured to project modulated electromagnetic radiation of at least two frequencies to a point on a surface;
a sensor configured to receive and demodulate electromagnetic radiation reflected from the surface; and
a controller apparatus operatively coupled to the sensor, and configured to:
determine a weighted phase difference between respective phases of the at least two frequencies;
determine one bin for each of the at least two reflected frequencies for a distance to the point on the surface from a point where modulated electromagnetic radiation is projected using the weighted phase difference;

determine a final phase of the bin for the distance to the point on the surface from the point where modulated electromagnetic radiation is projected as a weighted average of the phases of the bins based on the signal strengths of the at least two reflected frequencies;

determine the distance to the point on the surface from the point where modulated electromagnetic radiation is projected based on the final phase; and output the distance to the point on the surface from the point where modulated electromagnetic radiation is projected to a host device.

16. The system of claim 15, wherein determining the weighted phase difference between the at least two frequencies includes, monotonically increasing a value for the weighted phase difference from zero by a difference between the products of a coefficient for each frequency and a phase for each corresponding frequency.

17. The system of claim 16, wherein the coefficient for each frequency is proportional to a weight of signal strength of received electromagnetic radiation of each respective frequency.

18. The system of claim 15, wherein using the weighted phase difference to determine one bin for each of the at least two frequencies for the distance to the point on the surface from the point where modulated electromagnetic radiation is projected includes, for each bin, performing a bit-wise right shift operation on a product of the weighted phase difference and an integer proportional to a frequency associated with that bin.

19. The system of claim 15, wherein determining one bin for each of the at least two frequencies for the distance to the point on the surface from the point where modulated electromagnetic radiation is projected using the weighted phase difference further includes, comparing an absolute value of the residue of each bin for each of the at least two frequencies to determine which bin has a residue that is greater than or equal to the other bin.

20. The system of claim 15, wherein the controller apparatus is further configured to determine an unambiguous phase for each of the frequencies using the one bin for each of the at least two frequencies, and in which determining a final phase of the bin for the distance to the point on the surface from the point where modulated electromagnetic radiation is projected includes determining a weighted average of the unambiguous phases of the frequencies using weights based on signal strengths of received electromagnetic radiation of the frequencies.

* * * * *